United States Patent
Hu et al.

(10) Patent No.: US 8,117,060 B2
(45) Date of Patent: Feb. 14, 2012

(54) GEOGRAPHIC DEMAND DISTRIBUTION AND FORECAST

(75) Inventors: Wenyan Hu, Shanghai (CN); Qiang Wang, Shanghai (CN); Xiaoyuan Wu, Shanghai (CN); Alvaro Bolivar, San Francisco, CA (US)

(73) Assignee: eBay Inc., San Jose, CA (US)

( * ) Notice: Subject to any disclaimer, the term of this patent is extended or adjusted under 35 U.S.C. 154(b) by 758 days.

(21) Appl. No.: 11/961,101

(22) Filed: Dec. 20, 2007

(65) Prior Publication Data

US 2009/0164294 A1  Jun. 25, 2009

(51) Int. Cl.
*G06Q 10/00* (2006.01)
*G06F 17/30* (2006.01)
(52) U.S. Cl. ............... 705/7.31; 705/26.1; 705/26.3
(58) Field of Classification Search ............... None
See application file for complete search history.

(56) References Cited

U.S. PATENT DOCUMENTS

| | | | |
|---|---|---|---|
| 5,832,456 A * | 11/1998 | Fox et al. ................ | 705/7.31 |
| 6,298,328 B1 * | 10/2001 | Healy et al. ................ | 705/10 |
| 6,338,055 B1 | 1/2002 | Hagmann et al. | |
| 6,999,957 B1 | 2/2006 | Zamir et al. | |
| 7,031,961 B2 | 4/2006 | Pitkow et al. | |
| 7,181,406 B1 * | 2/2007 | Modest ................ | 705/36 R |
| 7,257,577 B2 | 8/2007 | Fagin et al. | |
| 7,295,995 B1 | 11/2007 | York et al. | |
| 2003/0191683 A1 * | 10/2003 | Bailey ................ | 705/10 |
| 2005/0246358 A1 * | 11/2005 | Gross ................ | 707/100 |
| 2006/0259462 A1 | 11/2006 | Timmons | |
| 2006/0294086 A1 | 12/2006 | Rose et al. | |
| 2007/0094247 A1 | 4/2007 | Chowdhury et al. | |
| 2010/0070342 A1 | 3/2010 | Hu et al. | |

OTHER PUBLICATIONS

Maptitude; Maptitude Overview; Feb. 1999; Caliper.com; pp. 1-4.*
Steiner, Ina; Turn eBay Data Into Dollars; Dec. 21, 2005; McGraw-Hill Companies; pp. 145-160.*
Steiner, Ina; Turn eBay Data Into Dollars; Jan. 2006; McGraw-Hill Companies; pp. 145-160.*
"Collective Discovery Network", *Aggregate Knowledge, Inc.*, [Online]. Retrieved from the Internet: <URL: http://www.aggregateknowledge.com/services/network.html>, (Copyright 2006-2007), 2 pgs.
"Discovery for Media", *Aggregate Knowledge, Inc.*, [Online]. Retrieved from the Internet: <URL: http://www.aggregateknowledge.com/services/media.html>, (Copyright 2006-2007), 2 pgs.
"Discovery for Retail", *Aggregate Knowledge, Inc.*, [Online]. Retrieved from the Internet: <URL: http://www.aggregateknowledge.com/services/retail.html>, (Copyright 2006-2007), 2 pgs.

(Continued)

*Primary Examiner* — Susanna M Meinecke Diaz
*Assistant Examiner* — Ashley Chou
(74) *Attorney, Agent, or Firm* — Schwegman, Lundberg & Woessner, P.A.

(57) ABSTRACT

A computerized method and a system for providing geographic demand distribution and forecast are provided. Example embodiments may include receiving a criterion to identify an item and searching a database for data associated with a geographic distribution of demand for the item identified by the criterion. The computerized method may also include presenting the geographic distribution of the demand for the item on a map. The map may display multiple geographic areas; each one of the multiple geographic areas may be displayed with a first and a second attribute. The first and the second attributes may be associated with the demand.

18 Claims, 10 Drawing Sheets

OTHER PUBLICATIONS

"RSS—Wikipedia, the free encyclopedia", [Online]. Retrieved from the Internet: <URL: http://en.wikipedia.org/wiki/RSS>, (Apr. 9, 2008), 11 pgs.

"Topical—Definition from the Merriam-Webster Online Dictionary", [Online]. Retrieved from the Internet: <URL: http://www.merriam-webster.com/dictionary/topical>, (Downloaded Apr. 9, 2008), 2 pgs.

"Yahoo! Buzz Index", [Online]. Retrieved from the Internet: <URL: http://buzzlog.buzz.yahoo.com/rss_info/>, (2008), 2 pgs.

Bomhardt, Christian, "NewsRec, a SVM-driven Personal Recommendation System for News Websites", *Proceedings of the 2004 IEEE/WIC/ACM International Conference on Web Intelligence*, (2004), 545-548.

Jia, Jack, "The Long Tail of E-Commerce", *E-Commerce Times*, [Online]. Retrieved from the Internet: <URL: http://www.ecommercetimes.com/story/57766.html>, (Jun. 11, 2007), 4 pgs.

Porter, Joshua, "Watch and Learn: How Recommendation Systems are Redefining the Web", [Online]. Retrieved from the Internet: <URL: http://wwvv.uie.com/articles/recommendation_systems>, (Dec. 13, 2006), 5 pgs.

\* cited by examiner

GEOGRAPHIC DEMAND DISTRIBUTION AND FORECAST

TECHNICAL FIELD

Example embodiments relate generally to the technical field of data management, and in one specific example, to a system and a method for providing geographic demand distribution and forecast.

BACKGROUND

More and more Internet users are realizing the ease and convenience of buying and selling online by way of person-to-person online trading. As a result, collectors, hobbyists, small dealers, unique item seekers, bargain hunters, and other consumers are able to buy and sell millions of items at various online commerce systems.

The success of an online commerce system depends upon its ability to provide an enjoyable shopping experience and an easy-to-use environment in which buyers and sellers may be able to close transactions with peace of mind. The online commerce systems may also benefit from providing buyers and sellers with transaction related information and statistics.

BRIEF DESCRIPTION OF THE DRAWINGS

Some embodiments are illustrated by way of example and not limitation in the figures of the accompanying drawings in which.

DETAILED DESCRIPTION

Example methods and systems for providing geographic demand distribution and forecast have been described. In the following description, for purposes of explanation, numerous specific details are set forth in order to provide a thorough understanding of example embodiments. It will be evident, however, to one skilled in the art that the present invention may be practiced without these specific details.

Some example embodiments described herein may include receiving a criterion identifying an item and searching a database for data associated with a geographic distribution of demand for a type of item identified using the criterion. The method may also include presenting the geographic distribution of the demand for the item on a map. The map may display multiple geographic areas; each one of the multiple geographic areas may be displayed with a first and a second attribute. The first and the second attributes may be associated with the demand.

In an example embodiment, receiving a criterion may comprise receiving a search query from a user of a commerce system. The search query may include keywords and logical constructs as is well known in the field of data retrieval. A commerce system database may be searched for demand data associated with the type of item identified by the criterion. Hereafter, the word "item" may be used to refer to a set of items with similar characteristics, specifically, the characteristics identified by the search criterion. The demand data may be sorted based on geographic locations associated with the data. The sorted demand data may be presented on a map with the map displaying multiple geographic areas. Each one of the multiple geographic areas may be displayed with a first and a second attribute related to the sorted demand data for the geographic area. The first attribute may indicate a demand for the item and the second attribute may indicate a trend for the demand for the item.

Example System Architecture

Figure 1:
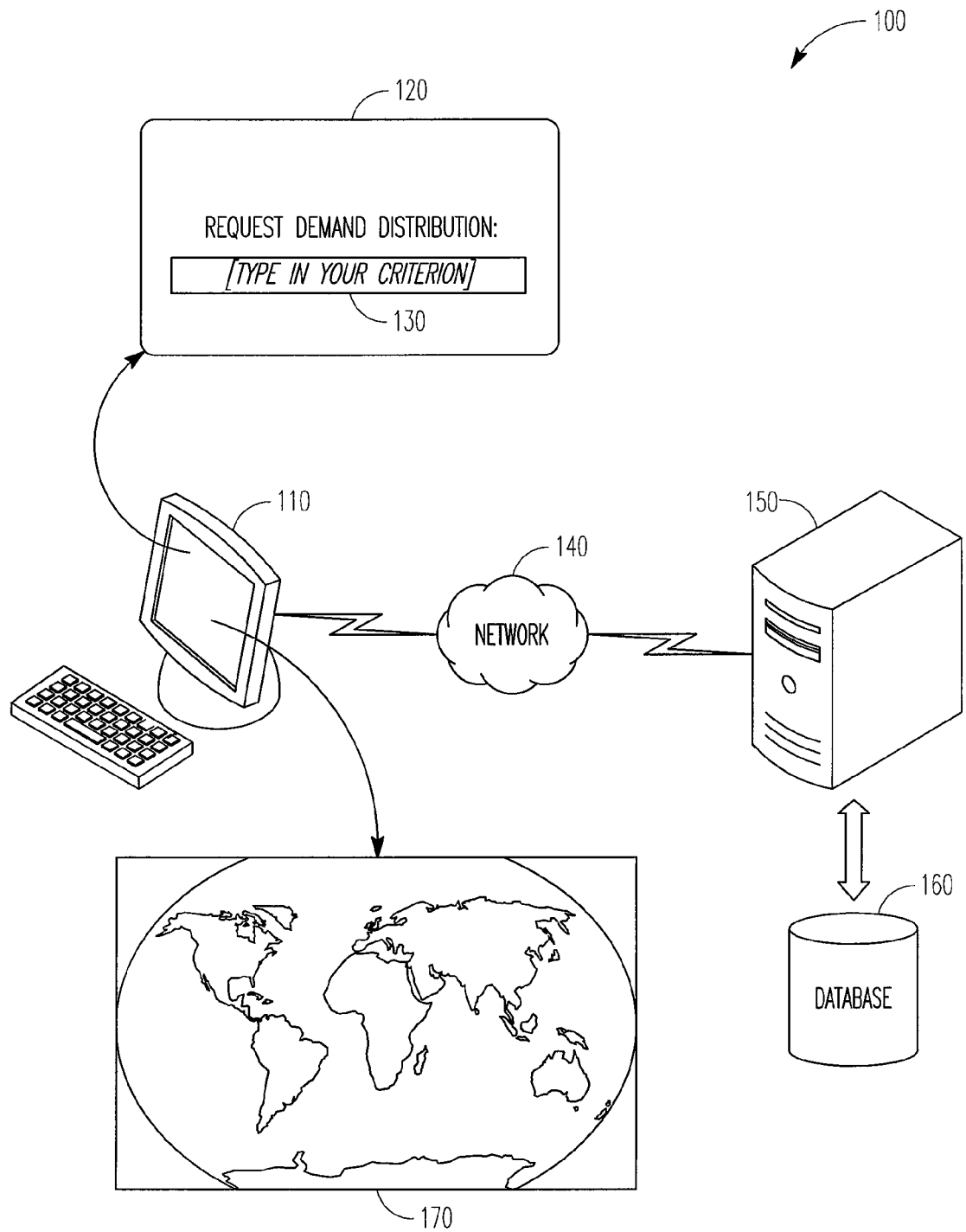
FIG. 1 is a high-level diagram depicting an example embodiment of a geographic demand distribution forecasting system.

FIG. 1 is a high-level diagram depicting an example embodiment of a system 100 for forecasting geographic demand distribution. According to an example embodiment, using a client machine 110, a user may log into a Web page 120 of a commerce system (e.g. EBAY INC. of San Jose Calif.) to request a geographic demand distribution of a type of item. The user may enter a criterion to identify the type of item. In one embodiment, the user may enter a criterion by entering a search query in the query box 130 of the Web page 120. The commerce system server 150, coupled via a network 140 to the client machine 110, may receive the criterion.

Figure 9:
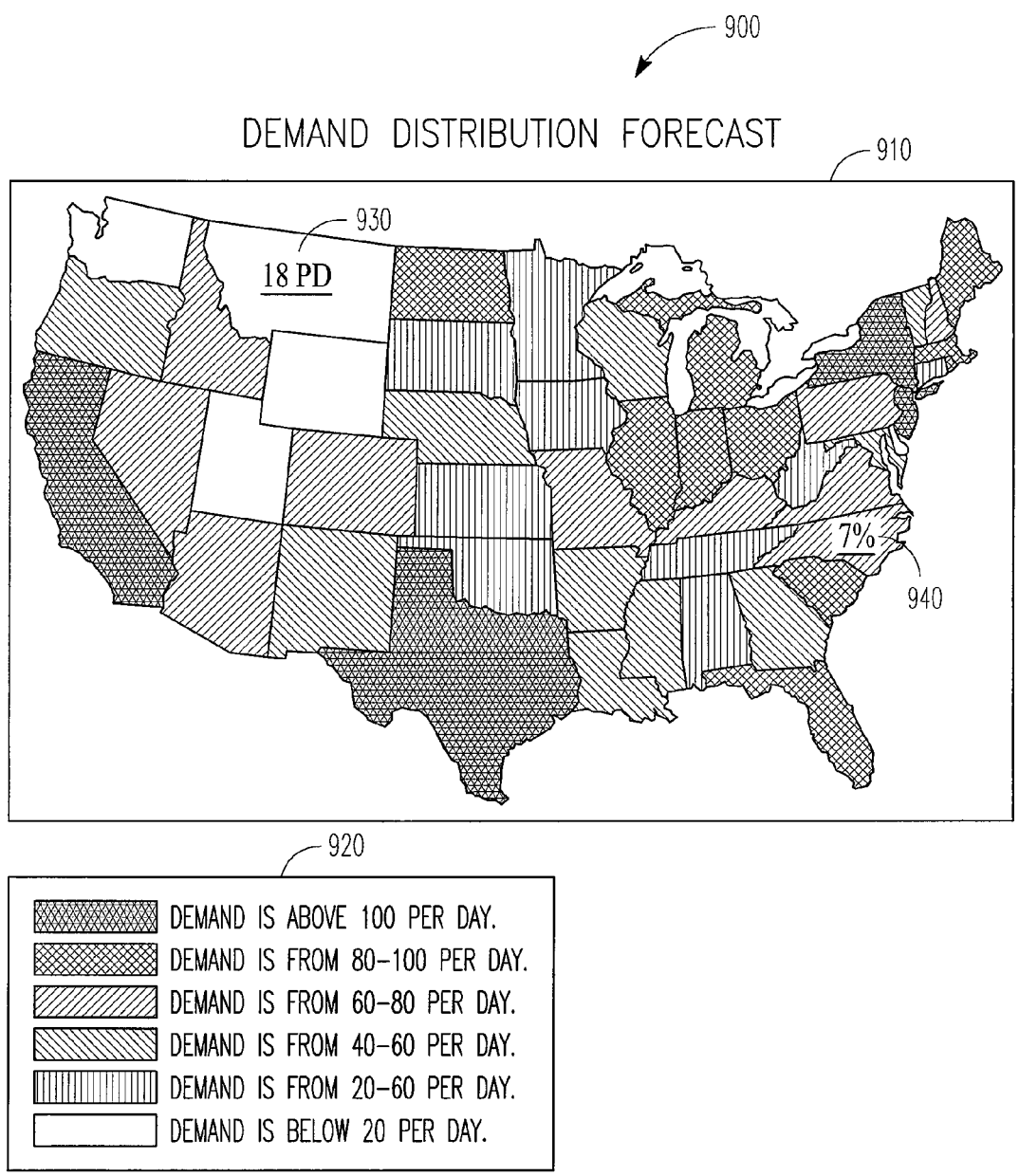
FIG. 9 is a diagram illustrating in an example embodiment a map showing a geographic demand distribution.
Figure 10:
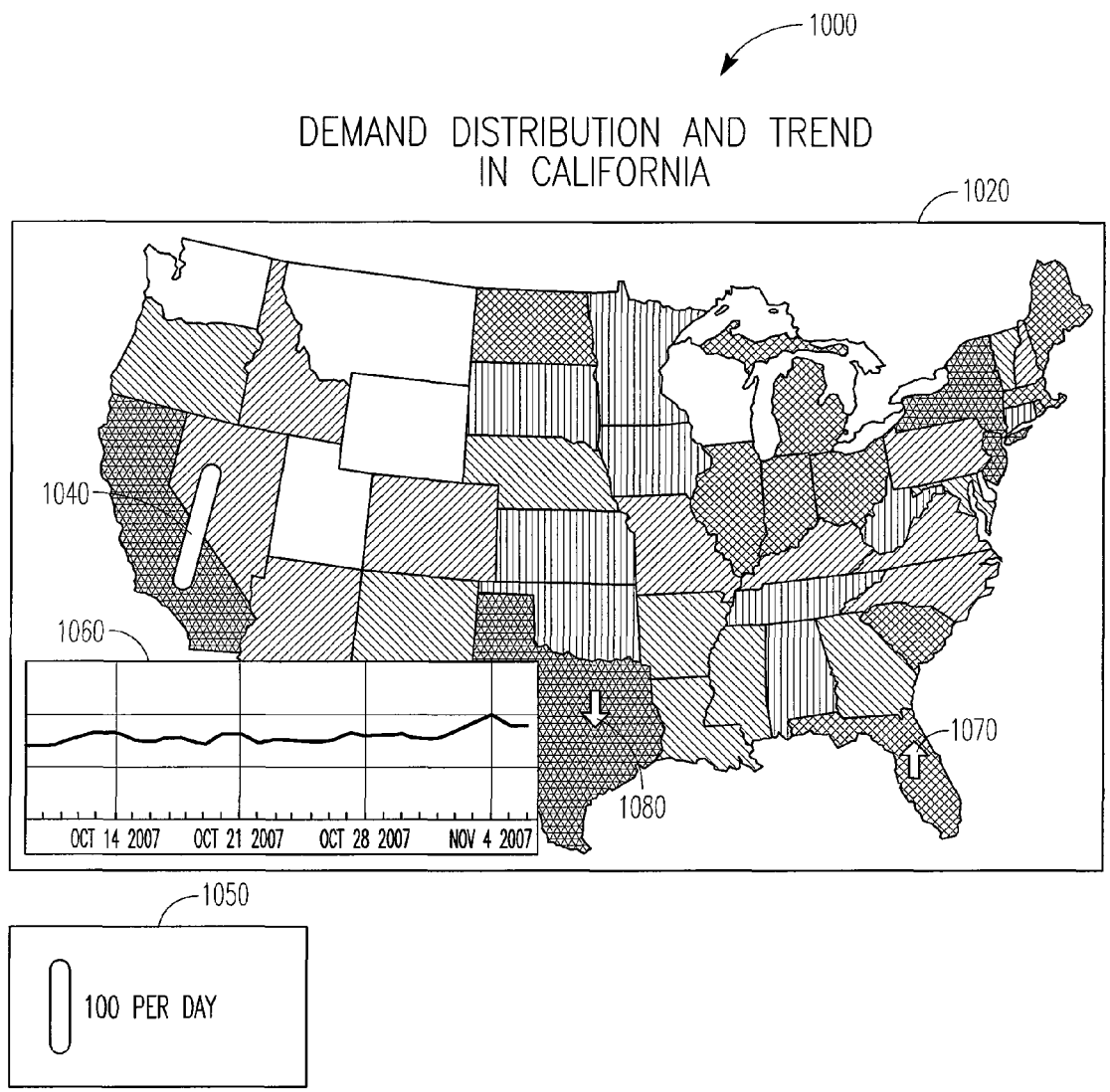
FIG. 10 is a diagram illustrating in an example embodiment a map showing a geographic demand distribution and a demand trend.

In example embodiments, the commerce system server 150 may use the criterion to search a database 160 for data associated with a geographic distribution of demand for the item. The commerce system may present a geographic distribution of the demand on a map 170. The map may be displayed with a first and a second attribute. The first and the second attributes may be associated with the item. The first attribute may include a demand indicator (e.g., a color as shown in FIG. 9), and the second attribute may include a demand trend indicator (e.g., an up or a down arrow or a chart as shown in FIG. 10).

Figure 2:
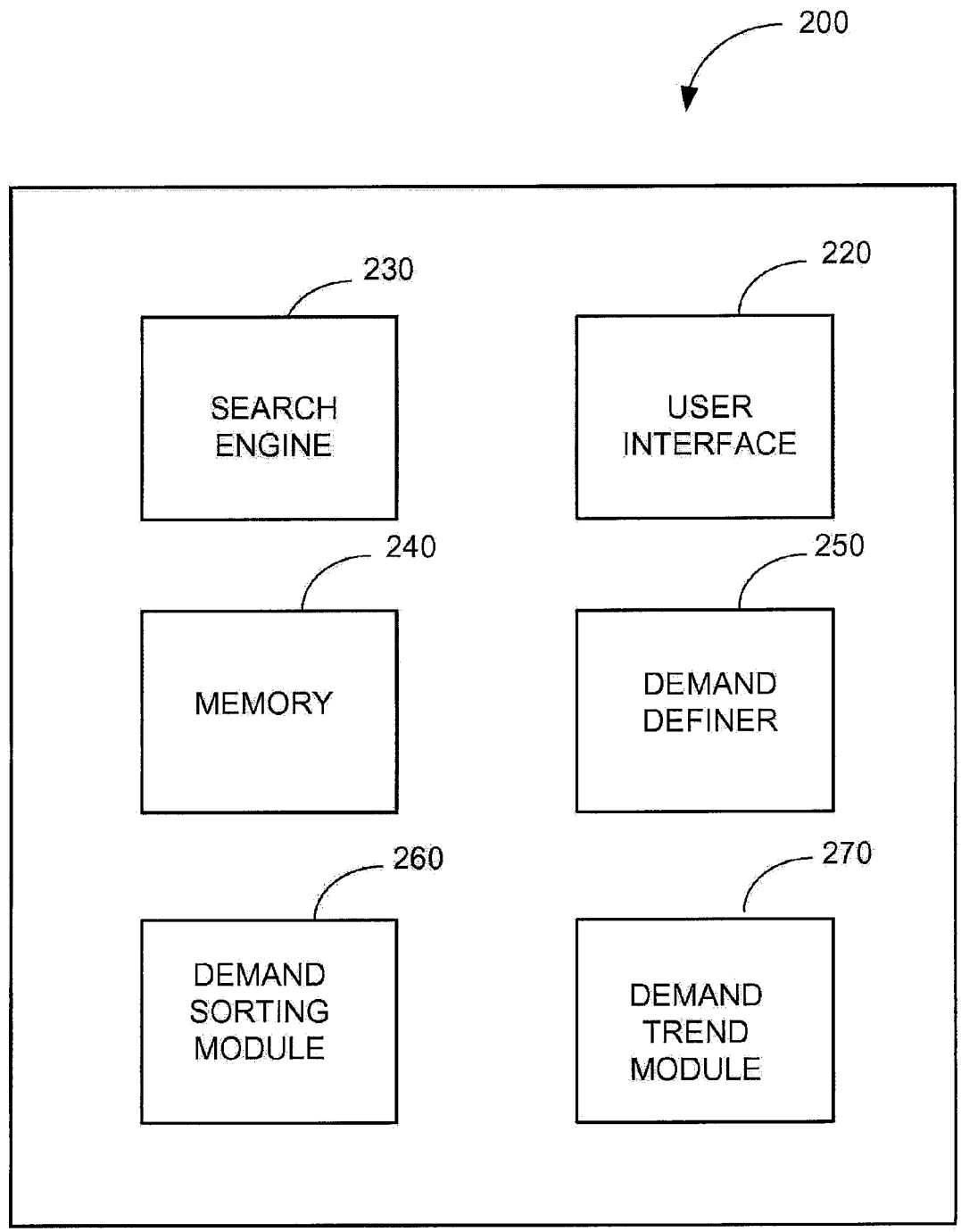
FIG. 2 is a block diagram illustrating an example embodiment of a system for forecasting geographic demand distribution.

FIG. 2 is a block diagram illustrating an example embodiment of a system 200 for forecasting geographic demand distribution. System 200 may include a user interface 220, a search engine 230, a memory 240, a demand definer 250, a demand sorting module 260, and a demand trend module 270.

According to example embodiments, the user interface 220 may receive, via the network 140 from a Web page 120, a criterion entered by a user of a commerce system. The criterion may then be used by the search engine 230 to search the memory 240 for data associated with a geographic demand distribution for the item. In an example embodiment, the memory may include the database 160 or some distributed databases associated with the commerce system. The memory 240 may store the data associated with the geographic demand distribution for the item.

In example embodiments, normal business operation of the commerce system may include recording information related to all visitor events (e.g., search query, view, bids, completed auctions and BIN (Buy It Now) events) registered in the commerce system. The visitor event information may be associated with known visitor identification information that may include the name, address, phone number, and the like of the visitors to the commerce system Website. In cases where the visitor does not sign into the system, the site may be able to examine a cookie on the user's computer system to determine the visitor's identification information.

Returning to the search engine 230 functionality, the search engine 230 may search for one or more relevant listings of the commerce system that may match the item and fulfill the criterion entered by the user. The search engine 230 may then search the memory for the statistics derived from the listing logs of the commerce system, such as the visitor events information associated with the relevant listings. The retrieved visitor event information may be associated with the visitor location information of the visitors of the commerce system who contributed to the visitor events associated with the one or more relevant listings. The retrieved information may then be sorted by the demand sorting module 260 to obtain the number of individual visitor events (e.g., search query, view, bid, BIN, and completed auctions) associated with the one or more relevant listings. For example, if the item is a laptop computer, the relevant listings may include the listings of all brands of notebook computers. For this example the total number of visitor events obtained for a specific geographical area may amount to: the number of searches (10,921), the number of views (3,560), the number of bids (1,264), the number of BINs (384), the number of completed auctions (734).

The number of visitor events found by the demand sorting module 260 may not directly constitute the demand for the item in that geographical area. The demand definer 250 may define the demand for the item as a function of an implicit and a satisfied demand. The implicit demand for an item may include the number of searches, bids, and views for relevant listings associated with that item. The satisfied demand for an item may be characterized by the total number of completed sales of relevant listings associated with that item. The completed sales may be from auctions (bid based sales) or set price sales (BIN based sales).

In an example embodiment, the demand definer 250 may combine the implicit and satisfied demand for the item using predefined weights to obtain the demand for the item. For example, the demand may be defined by the following equation: demand=0.20 (implicit demand)+0.8 (satisfied demand). In one embodiment, this could be presented in greater detail as: demand=0.20 (searches+views+bids)+0.8 (completed auctions+completed BIN based sales).

In an alternative embodiment, the demand may be defined applying a more granular formula using the numbers associated with individual visitor events, each with a predefined weight. For example, the demand may be obtained from: demand=0.05 (number of searches)+0.15 (number of views)+0.10 (number of bids)+0.20 (number of auction sales)+0.5 (number of BIN based sales). The demands for relevant listings associated with the item calculated based on the formulas, such as the above formulas, may be stored in the memory 240.

According to example embodiments, the user interface 220 may present the geographical demand distribution and the demand trend for the item on a map. The map may display different geographical areas (e.g., countries, states, counties, cities, etc.) with different colors. The color of each geographical area may represent the value of the demand for the item in that area. Other attributes may also be used to distinguish different areas in terms of the demand for the item in those areas. For example, the map may display a number on each area over the map to represent the magnitude of the demand for that area. The numbers may directly indicate the demand magnitude or be specified as a percentage of the total demand. For example, the demand for laptop computers in California may be displayed as 12%. The 12% in this context may represent 12% of the total demand in the Unites States. The total demand for the Unites States may be displayed separately, e.g., under the map.

In example embodiments, the demand trend module 270 may use the calculated demand data for an item over time to obtain a demand trend (e.g., the chart shown in FIG. 10) for the item. The user interface 220 may display the demand trend for the item as a time variation of demand over a predefined period of time (see, for example, FIG. 10). The demand trend may also be displayed with up or down arrows on each geographical area on the map. The up arrow may indicate that present demand for the item in that geographical area shows growth as compared to a demand for the item in a predefined period of time or at a certain instance of time in the past. The down arrow may indicate that present demand for the item in that geographical area shows a reduction as compared to a demand for the item in a predefined period of time in the past or on a certain date in the past.

Figure 3:
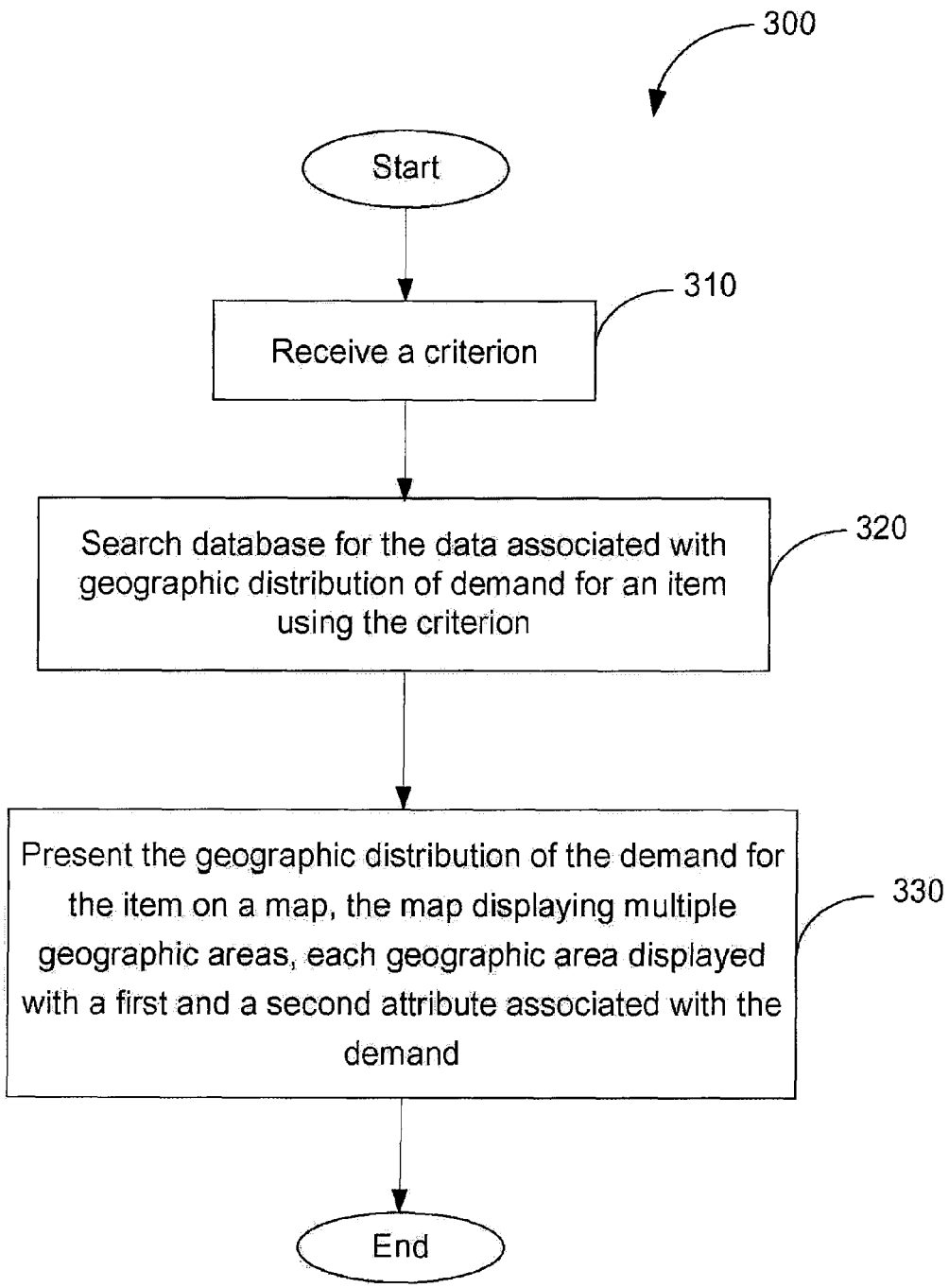
FIG. 3 is a high-level flow diagram illustrating an example method of forecasting geographic demand distribution.

FIG. 3 is a high-level flow diagram illustrating an example method 300 for forecasting geographic demand distribution. The method may start at operation 310, where a criterion entered by a user of a commerce system may be received by the user interface 220, via the network 140, from the Web page 120. The criterion may then be used at operation 320 by the search engine 230 to search the memory 240 for data associated with a geographic demand distribution for the item. In an example embodiment, the memory may include the database 160 or some other distributed databases associated with the commerce system. The memory 240 may store the data associated with the geographic demand distribution for the item.

According to an example embodiment, the search engine 230 may search the memory for statistics derived from listing logs of the commerce system. The statistics may be related to the implicit demand and/or the satisfied demand. The statistics derived from the listing logs of the commerce system may also include statistics associated with each of the multiple geographic areas shown on a map.

The geographic demand distribution may be defined by the demand definer 250 based on the geographically sorted data prepared by the demand sorting module 260 (for more details, refer to description of FIG. 2). At operation 330, the user interface 220 may present the geographic demand distribution for the item on a map. The map may display multiple geographic areas. The user interface 220 may display each geographic area with a first and a second attribute associated with the demand. For example, the first attribute may include a demand indicator (e.g., a color as shown in FIG. 9), and the second attribute may include a demand trend indicator (e.g., an up or a down arrow or a chart as shown in FIG. 10).

Figure 4:
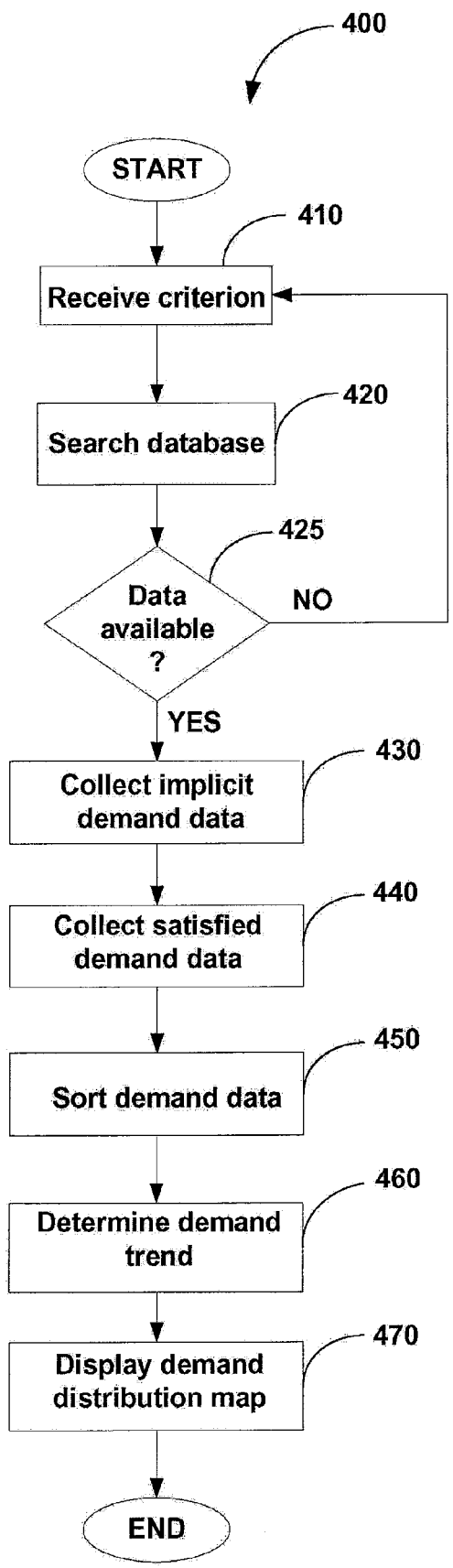
FIG. 4 is a flow diagram illustrating an example method of forecasting demand distribution.

FIG. 4 is a flow diagram illustrating an example method 400 of forecasting demand distribution. According to the method 400, at operation 410, the user interface 220 may receive a criterion from a user of a commerce system. At operation 420, the search engine 230 may use the criterion to search the memory 240 for data corresponding to the listings associated with an item of interest to the user. At control operation 425, if it is determined that, using the criterion, the data for the item may not be available in memory 240, the control may be passed to the operation 410, where a new criterion may be received from the user. However, if control operation 425 indicates a positive result (meaning that the data is available), in a next step at operation 430, the search engine 230 may search for and collect implicit demand data (e.g., data associated with the searches and views of the listings related the item). At operation 440, the search engine 230 may search for and collect satisfied demand data (e.g., data associated with bids and BINs on listings related to the item).

In example embodiments, at operation 450, the collected implicit and satisfied demand data may be sorted by the demand sorting module 260 into geographically distributed data for each area of the map. The user may select the geographic areas for which the demand distribution is desired. At operation 460, the demand definer 250 may define a demand equation, based on which a geographic demand for the item may be determined using the sorted implicit and satisfied data.

In an example embodiment, the demand trend module 270 may be used at operation 470 to determine the demand trend for the item. The demand trend may suggest how the present time demand compares with the demand in a predefined period of time in the past or a on certain date in the past. According to example embodiments, at operation 470, the user interface 220 may present a map displaying the geographic demand distribution. The level of demand for each area may be displayed with a color specific to that level. The demand trend may be displayed using a chart showing a time variation of the demand over a predefined time period. In an alternative example embodiment, the demand trend may be displayed with up/down arrows indicating up/down variation in the level of the demand for the item compared to a predefined period of time in the past or on a certain date in the past.

Figure 5:
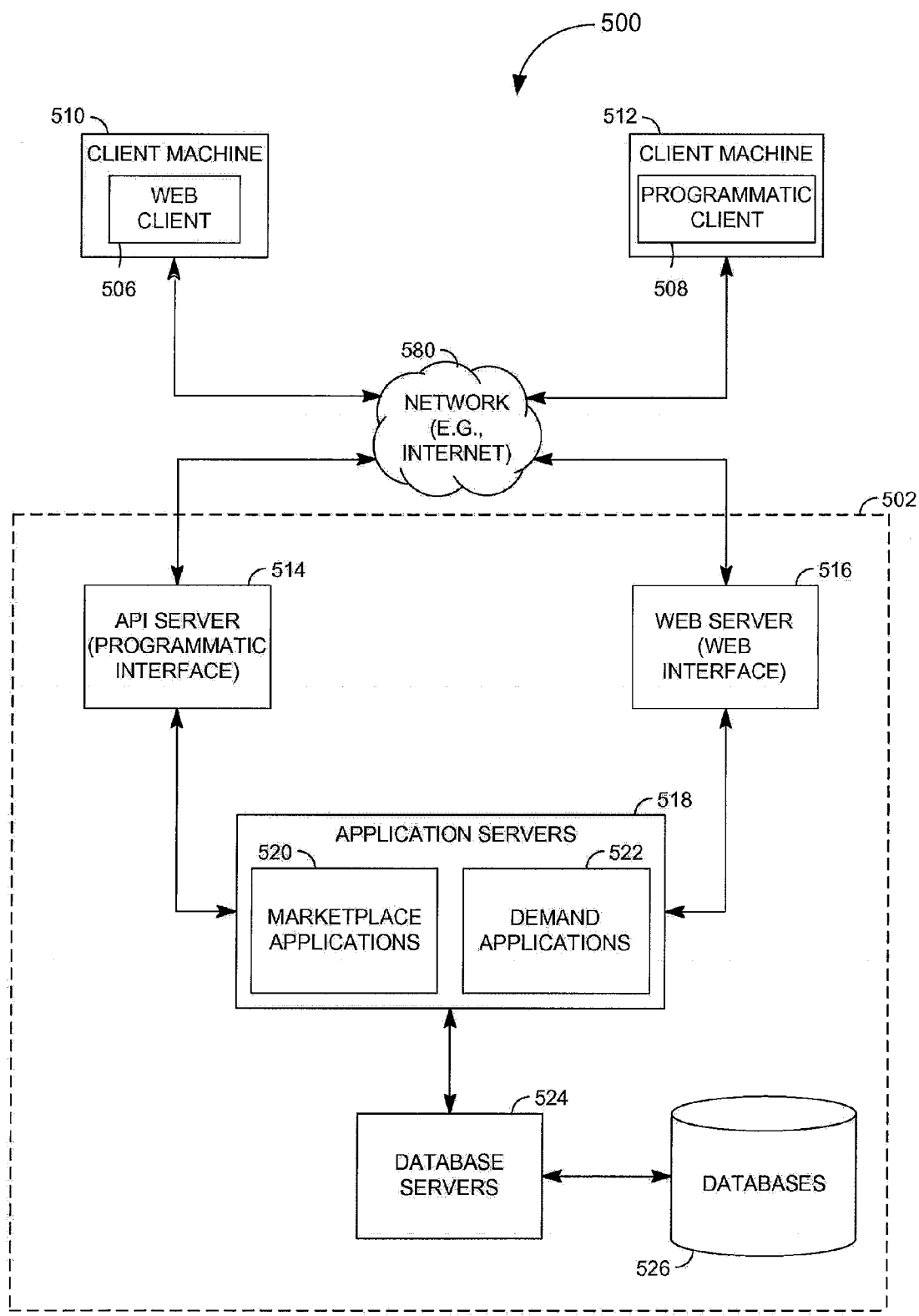
FIG. 5 is high level block diagram illustrating an example embodiment of a network-based marketplace providing geographic demand distribution and forecast, having a client-server architecture.

FIG. 5 is high level block diagram illustrating an example embodiment of a network-based marketplace 500, providing geographic demand distribution and forecast and having a client-server architecture. A commerce platform, in the example form of a geographic demand distribution forecasting server 502, provides server-side functionality, via a network 580 (e.g., the Internet) to one or more clients. FIG. 5 illustrates, for example, a Web client 506 (e.g., a browser, such as the INTERNET EXPLORER browser developed by Microsoft Corporation of Redmond, Wash.), and a programmatic client 508 executing on respective client machines 510 and 512.

Turning specifically to the geographic demand distribution forecasting server 502, an Application Program Interface (API) server 514 and a Web server 516 are coupled to, and provide programmatic and Web interfaces respectively to, one or more application servers 518. The application servers 518 host one or more marketplace applications 520 and demand applications 522. The application servers 518 are, in turn, shown to be coupled to one or more database servers 524 that facilitate access to one or more databases 526.

The marketplace applications 520 may provide a number of marketplace functions and services to users that access the network-based marketplace 500. The demand applications 522 may use the data stored in the databases 526 to provide geographic demand distribution for an item, using a criterion received from the users.

Further, while the network-based marketplace 500 shown in FIG. 5 employs a client-server architecture, the disclosed system is, of course, not limited to such an architecture and could equally well find application in a distributed, or peer-to-peer, architecture system. The various marketplace and demand applications 520 and 522 could also be implemented as standalone software programs, which do not necessarily have networking capabilities.

The Web client 506 may access the marketplace and demand applications 520 and 522 via the Web interface supported by the Web server 516. Similarly, the programmatic client 508 may access the various services and functions provided by the marketplace and demand applications 520 and 522 via the programmatic interface provided by the API server 514. The programmatic client 508 may, for example, be a demand search application to enable power sellers to obtain geographic distribution of demand for an item using the geographic demand distribution forecasting server 502 in an off-line manner, and to perform batch-mode communications between the programmatic client 508 and the geographic demand distribution forecasting server 502.

Figure 6:
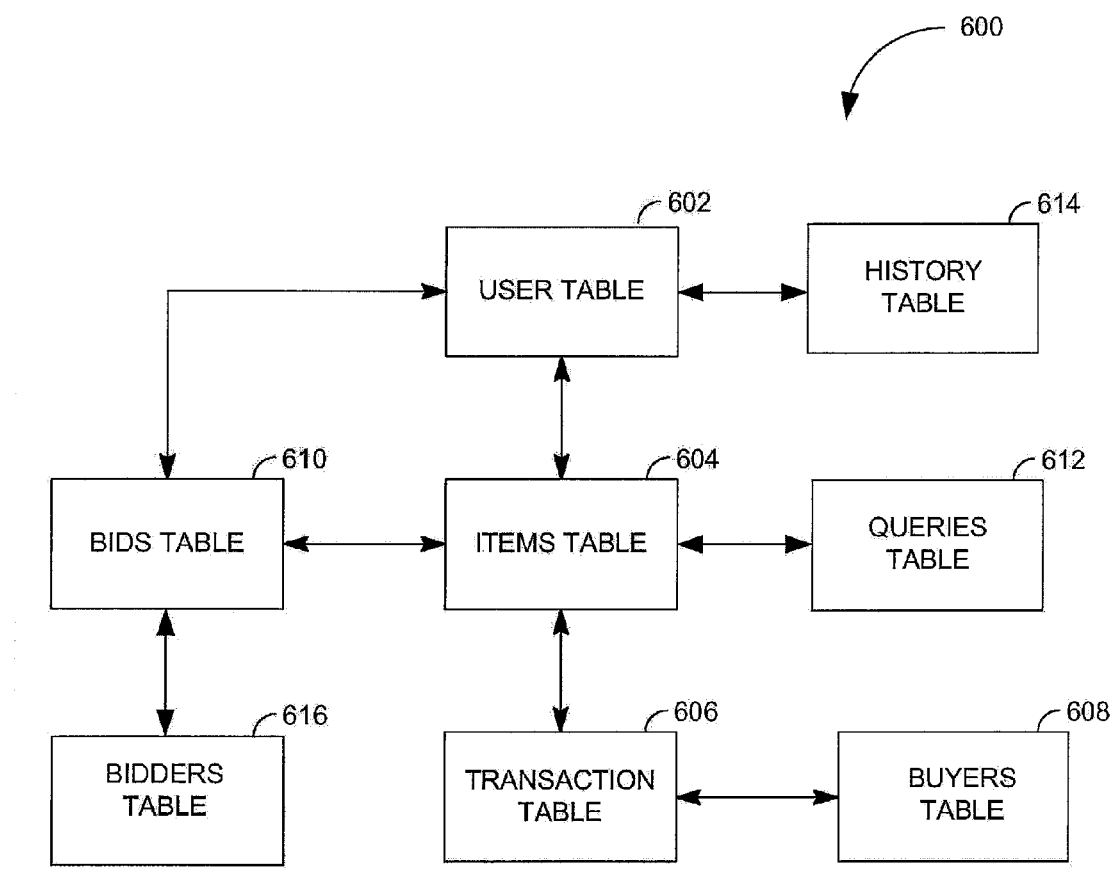
FIG. 6 is block diagram illustrating an example embodiment of tables used by the databases of the network-based marketplace of FIG. 5.

FIG. 6 is a high-level entity-relationship diagram, illustrating various tables 600 that may be maintained within the databases 526 that may be utilized by and support the geographic demand distribution forecasting server 502. A user table 602 contains a record for each registered user of the network-based marketplace 500, and may include identifier, address and financial instrument information pertaining to each such registered user. A user may operate as a seller, a buyer, or both, in the network-based marketplace 500. In one example embodiment, a buyer may be a user that has accumulated value (e.g., commercial or proprietary currency), and may then be able to exchange the accumulated value for items that are offered for sale by the network-based marketplace 500.

The tables 600 also include an items table 604 in which may be maintained item records for goods and services that are available to be, or have been, transacted via the network-based marketplace 500. Each item record within the items table 604 may furthermore be linked to one or more user records within the user table 602, so as to associate a seller and one or more actual or potential buyers with each item record.

A transaction table 606 contains a record for each transaction (e.g., a purchase transaction) pertaining to items for which records exist within the items table 604.

A buyers table 608 is related to the transaction tables 606; each record in the buyers table may be associated with a buyer in a purchase transaction. Each record may include the buyer's information such as a name, geographic location information, a purchased item, and a purchase amount.

Bid records within a bids table 610 each relate to a bid received at the network-based marketplace server 402 in connection with an auction-format listing supported by the network-based marketplace 500. A queries table 612 is utilized, in one example embodiment, to construct and maintain the list of items searched for by prospective buyers.

A history table 614 maintains a history of transactions to which a user has been a party. One or more bidders tables 616 record information pertaining to bidders of the bids for which records exist within the bids table 610. Each record of the bidders table may be associated with a bidder of a bid recorded in bids table 610. Each record of the bidders table 616 may include the bidder's information such as a name, geographic location information, an item bidded for, and a price of the item.

Figure 7:
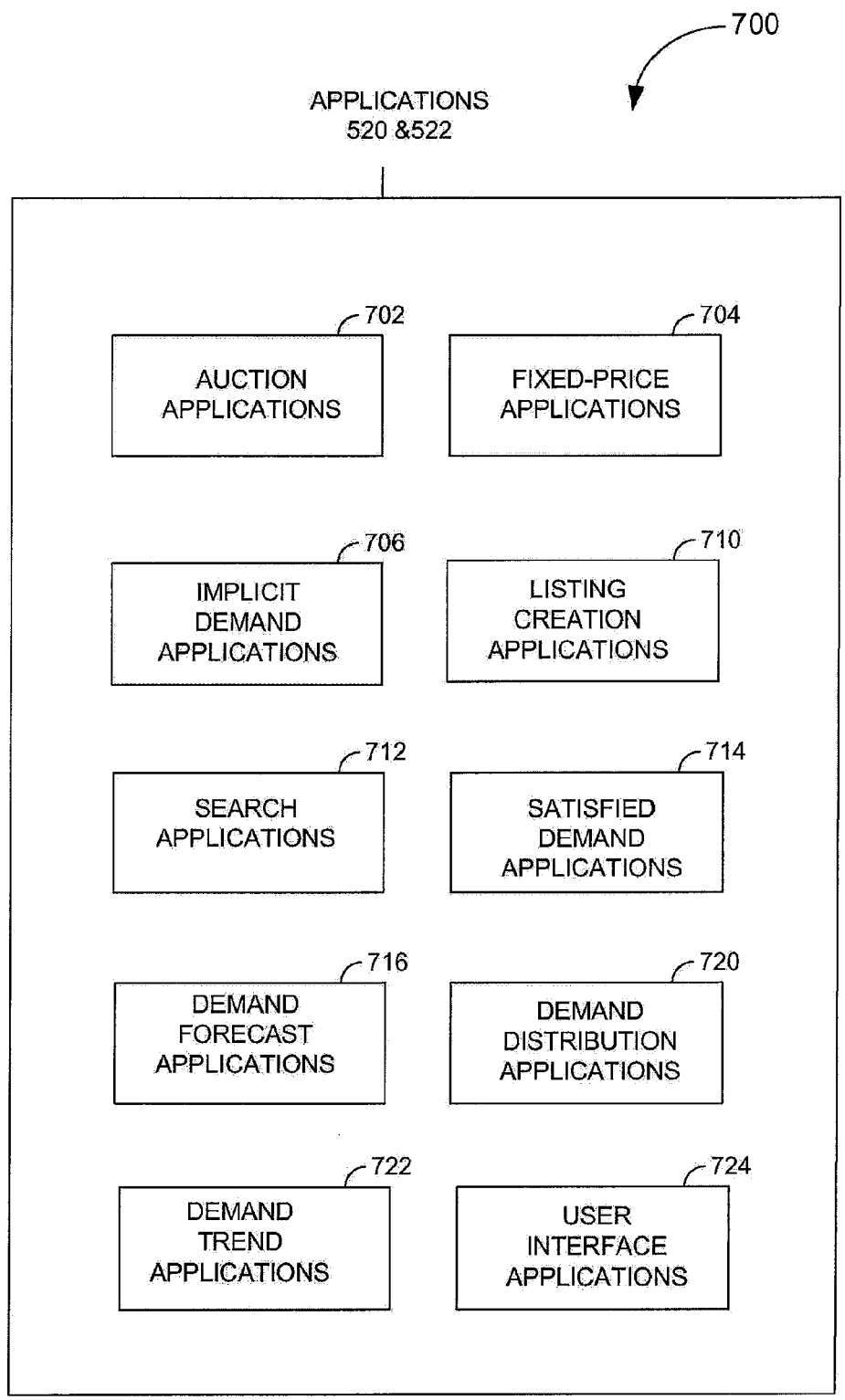
FIG. 7 is an example set of marketplace and demand applications used by the network-based marketplace of FIG. 5.

FIG. 7 illustrates an example set of marketplace and demand applications 700 provided as part of the network-based commerce system of FIG. 5. The geographic demand distribution forecasting server 502 may provide a number of marketplace applications 520, as well as demand applications 522, whereby a user may request a geographic demand distribution for an item related to listings in the marketplace system.

The various auction applications 702 may provide a number of features in support of auction-format listings, such as a reserve price feature whereby a seller may specify a reserve price in connection with a listing and a proxy-bidding feature whereby a bidder may invoke automated proxy bidding.

A number of fixed-price applications 704 may support fixed-price listing formats (e.g., the traditional classified advertisement-type listing or a catalogue listing) and buyout-type listings. Specifically, buyout-type listings, e.g., BINs, may be offered in conjunction with an auction-format listing and allow a buyer to purchase goods or services, which are also being offered for sale via an auction, for a fixed-price that is typically higher than the starting price of the auction.

Listing creation applications 710 may allow sellers to conveniently author listings pertaining to goods or services that they wish to transact via the network-based marketplace 500. Implicit demand applications 706 may support collecting information on implicit demand including the number of searches and the number of views associated with listings related to an item for which a geographic demand distribution is requested.

A number of search applications 712 may support searching the databases 526 of the network-based marketplace 500 for geographical demand distribution for an item, using a criterion received from a user of the network-based marketplace 500. Satisfied demand applications 714 may support collecting information on satisfied demand including the number of bids and BINs and the dollar amounts corresponding to the bids and BINs associated with listings related to an item for which a geographic demand distribution is requested.

Demand forecast applications 716 may provide one or more demand equations. The demand equations may be used to define a demand based on the implicit demand and the satisfied demand data collected by the implicit demand applications 706 and the satisfied demand applications 714. In example embodiments, the demand equation may define the demand for an item based on components of the implicit demand and the satisfied demand (e.g., number of searches, views, bids and BINs) for that item.

Demand distribution applications 720 may use the geographic location information associated with various users of the network-based marketplace 500 to provide a geographic demand distribution for an item. The geographic location information may be associated with searches or views of certain listings related to the item or with the number of bids and BINs on those listings. The demand distribution applications 720 may store the geographic demand distribution for the item in the databases 526 of FIG. 5.

Demand trend applications 722 may provide a trend for the demand of an item over time. The demand trend applications 722 may retrieve the geographic demand distribution for various geographic areas from the databases 526 at various time intervals and construct the demand trend based on the time variations of the demand or by comparing the present demand with the demand in a predefined time period in the past or on a predefined past date.

User interface applications 724 may provide support for presenting the geographical demand distribution and the demand trend for the item on a map. The map may display different geographical areas (e.g., countries, states, counties, cities, etc.) with different colors. The color of each geographical area may represent the level of the demand for the item in that area. The user interface applications 724 may display the demand trend for the item as a time variation of demand over a predefined period of time (see, for example, FIG. 10). The demand trend may also be displayed with up or down arrows on each geographical area on the map. The up arrow may indicate that present demand for the item in that geographical area shows growth as compared to a demand for the item in a predefined period of time or at a certain instance of time in the past. The down arrow may indicate that present demand for the item in that geographical area shows a reduction as compared to a demand for the item in a predefined period of time or at a certain instance of time in the past.

Machine Architecture

Figure 8:
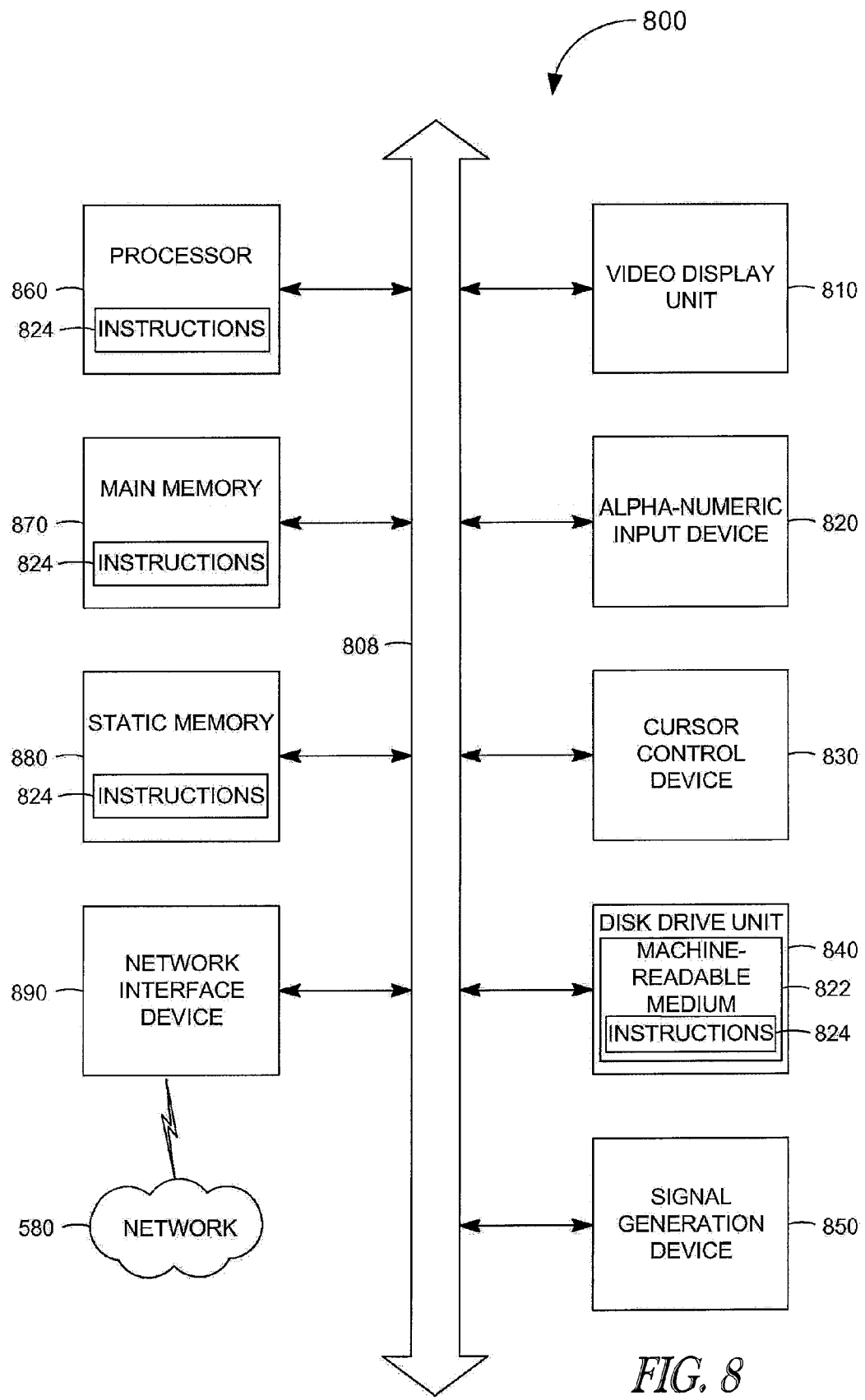
FIG. 8 is a block diagram illustrating a diagrammatic representation of a machine in the example form of a computer system.

FIG. 8 is a block diagram, illustrating a diagrammatic representation of machine 800 in the example form of a computer system within which a set of instructions for causing the machine to perform any one or more of the methodologies discussed herein may be executed. In alternative embodiments, the machine 800 may operate as a standalone device or may be connected (e.g., networked) to other machines. In a networked deployment, the machine 800 may operate in the capacity of a server or a client machine in a server-client network environment, or as a peer machine in a peer-to-peer (or distributed) network environment.

The machine 800 may be a server computer, a client computer, a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 may include a processor 860 (e.g., a central processing unit (CPU), a graphics processing unit (GPU) or both), a main memory 870 and a static memory 880, all of which communicate with each other via a bus 808. The computer system 800 may further include a video display unit 810 (e.g., a liquid crystal display (LCD) or cathode ray tube (CRT)). The computer system 800 also may include an alphanumeric input device 820 (e.g., a keyboard), a cursor control device 830 (e.g., a mouse), a disk drive unit 840, a signal generation device 850 (e.g., a speaker) and a network interface device 890.

The disk drive unit 840 may include a machine-readable medium 822 on which is stored one or more sets of instructions (e.g., software 824) embodying any one or more of the methodologies or functions described herein. The software 824 may also reside, completely or at least partially, within the main memory 870 and/or within the processor 860 during execution thereof by the computer system 800 with the main memory 870 and the processor 860 also constituting machine-readable media.

The software 824 may further be transmitted or received over a network 580 via the network interface device 890.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

FIG. 9 is a diagram illustrating in an example embodiment geographic demand distribution 900. The example geographic demand distribution 900 is associated with the listings on a commerce system related to an item. In the example of FIG. 9, the geographic demand is divided into the different states of the United States of America. However, other embodiments could use other geographic areas such as postal ZIP codes, telephone area codes, or countries on a world or continent map.

The geographic demand distribution 900 is shown on a map 910 of the United States, where the demand for the item in each state is displayed with a specific symbol (e.g., gray scale, color or the like). Legend 920 provides keys for symbols of the map defined in terms of various levels of demand for the item. For example the darkest gray scale may indicate that the level of demand for the item is above 100 units per day. The demand, as described above, may be defined based on the number of searches, views, bids and BINs for the listings related to the item in the commerce system.

In another example embodiment, the demand level in a geographic area may be represented with a demand level indicator number 930 displayed on the map. For example the demand level indicator number 930 shows the demand for the item in Montana to be 18 per day. In alternative example embodiments, the demand may be shown per different time units such as per week, per month, per year, etc. In yet another example embodiment, the demand in each area may be displayed as a percentage of the total demand in all areas shown on the map. For example, the demand indicator 940 shows that demand in North Carolina may be 7% of the national demand.

FIG. 10 is a diagram illustrating in an example embodiment a demand distribution and trend 1000. The demand distribution for an item is shown on the map 1020. Specifically, the bar 1040 is used to indicate the demand level for the item in Los Angeles. A guide 1050 may assist users in estimating the demand level from the height of the bar. For example, the bar 1040, estimably, indicates 150 items per day for Los Angeles.

Also shown in FIG. 10 is a trend 1060 for the item illustrated as a time variation of the demand for the item. The trend may be associated with the total demand for the United States or a specific state. In an alternative example embodiment, the trend may be depicted with a trend indicator, such as up or down arrows 1070 and 1080. The up or down arrows 1070 and 1080 may represent growth or a reduction in status of the present demand for the item compared to a predefined period of time in the past or on a certain date in the past.

Thus, a method and a system for providing geographic demand distribution and forecast have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computerized method comprising:
using one or more computer processors programmed to perform the operations of:
receiving a criterion, said criterion identifying an item;
searching a database for data associated with a geographic distribution of demand for the item identified by the criterion, the data associated with a geographic distribution of demand for the item including statistics derived from listing logs of a commerce system, the statistics being related to an implicit demand and a satisfied demand for the item, the implicit demand comprising an indication of the number of searches, bids, and views for relevant listings associated with the item;
calculating the geographic distribution of the demand for the item on the one or more processors based on a function of the implicit demand and the satisfied demand for the item, wherein a first weight is assigned to the implicit demand in the function and a second weight is assigned to the satisfied demand in the function; and
presenting the geographic distribution of the demand for the item on a map, the map displaying a plurality of geographic areas, each one of the plurality of geographic areas being displayed with a first and a second attribute, the first and the second attributes being associated with the demand.

2. The computerized method of claim 1, wherein the receiving of the criterion includes receiving the criterion over a network from a seller associated with the commerce system.

3. The computerized method of claim 1, wherein the presenting of the geographic distribution occurs if the searching of the database brings about a positive result.

4. The computerized method of claim 1, wherein the satisfied demand is derived from at least one of: purchasing amounts associated with bids on the item, or purchasing amounts associated with BINs (Buy It Now) on the item.

5. The computerized method of claim 1, wherein the statistics derived from the listing logs of the commerce system include statistics associated with each of the plurality of geographic areas.

6. The computerized method of claim 1, wherein the first attribute includes a demand level indicator.

7. The computerized method of claim 6, wherein the demand level indicator includes a color, and the color depends on the demand for the item in each one of the geographic area displaying the color.

8. The computerized method of claim 1, wherein the first attribute includes a number, the number being an indicator of the demand for the item in each one of the geographic areas displaying the number.

9. The computerized method of claim 1, wherein the second attribute includes a trend indicator.

10. The computerized method of claim 9, wherein the trend indicator displays an up or a down trend in a present demand for the item as compared with a demand on a predefined past date.

11. The computerized method of claim 9, wherein the trend indicator includes an up or a down arrow indicating an up or a down trend.

12. A system comprising:

a processor; and a memory including instructions, which when executed by the processor, cause the processor to:

receive a criterion, said criterion identifying an item;

store data associated with a geographic distribution of a demand for the item identified by the criterion, the data associated with a geographic distribution of demand for the item including statistics derived from listing logs of a commerce system, the statistics being related to an implicit demand and a satisfied demand for the item, the implicit demand comprising an indication of the number of searches, bids, and views for relevant listings associated with the item;

search the memory for the data associated with the geographic distribution of demand for the item;

calculate the geographic distribution of the demand for the item based on a function of the implicit demand and the satisfied demand for the item, wherein a first weight is assigned to the implicit demand in the function and a second weight is assigned to the satisfied demand in the function; and present the geographic distribution of the demand for the item on a map, the map displaying a plurality of geographic areas, each one of the plurality of geographic areas being displayed with a first and a second attribute, the first and the second attributes being associated with the demand.

13. The system of claim 12, wherein the user interface is to receive the criterion over a network from a seller associated with the commerce system.

14. The system of claim 12, wherein the user interface is to display the first attribute, the first attribute including a demand level indicator.

15. The system of claim 12, wherein the user interface is to display the second attribute, the second attribute including a trend indicator.

16. The system of claim 12, wherein the user interface is to present the second attribute, including a trend indicator.

17. A system comprising:

means for receiving a criterion, said criterion identifying an item;

a processor configured for searching a database for data associated with a geographic distribution of a demand for the item identified by the criterion, the data associated with a geographic distribution of demand for the item including statistics derived from listing logs of a commerce system, the statistics being related to an implicit demand and a satisfied demand for the item, the implicit demand comprising an indication of the number of searches, bids, and views for relevant listings associated with the item;

means for calculating the geographic distribution of the demand for the item based on a function of the implicit demand and the satisfied demand for the item, wherein a first weight is assigned to the implicit demand in the function and a second weight is assigned to the satisfied demand in the function; and means for presenting the geographic distribution of the demand for the item on a map, the map displaying a plurality of geographic areas, each one of the plurality of geographic areas being displayed with a first and a second attribute, the first and the second attributes being associated with the demand.

18. A non-transitory machine-readable medium comprising instructions, which when implemented by one or more processors perform the following operations:

receiving a criterion, said criterion identifying an item;

searching a database for data associated with a geographic distribution of demand for the item identified by the criterion, the data associated with a geographic distribution of demand for the item including statistics derived from listing logs of a commerce system, the statistics being related to an implicit demand and a satisfied demand for the item, the implicit demand comprising an indication of the number of searches, bids, and views for relevant listings associated with the item;

calculating the geographic distribution of the demand for the item based on a function of the implicit demand and the satisfied demand for the item, wherein a first weight is assigned to the implicit demand in the function and a second weight is assigned to the satisfied demand in the function; and presenting the geographic distribution of the demand for the item on a map, the map displaying a plurality of geographic areas, each one of the plurality of geographic areas being displayed with a first and a second attribute, the first and the second attributes being associated with the demand.

* * * * *